Dec. 1, 1931.   F. D. HOLDSWORTH   1,834,590
VALVE MECHANISM
Filed Dec. 29, 1927
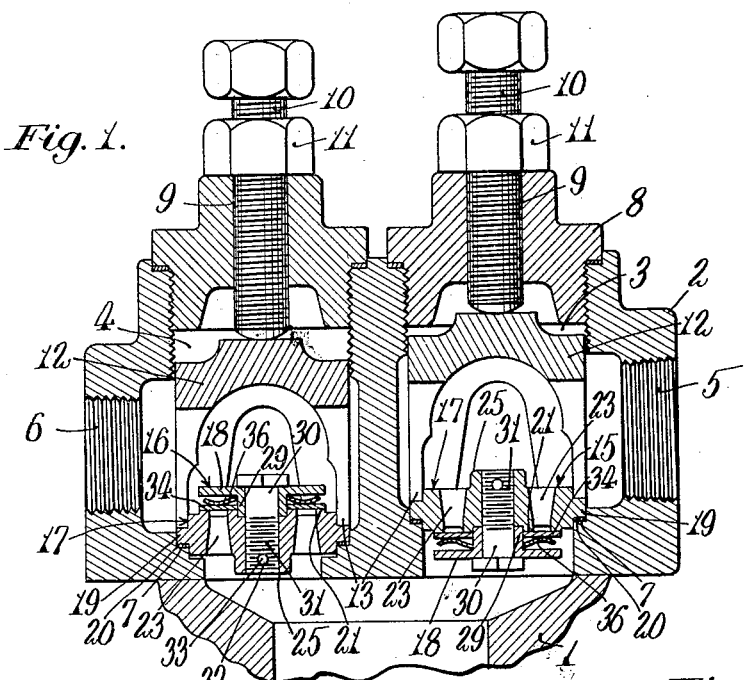
Fig. 1.
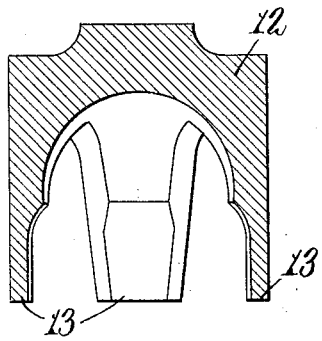
Fig. 2.
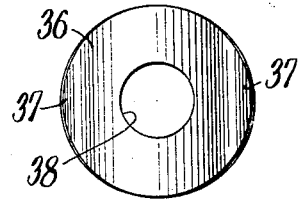
Fig. 6.
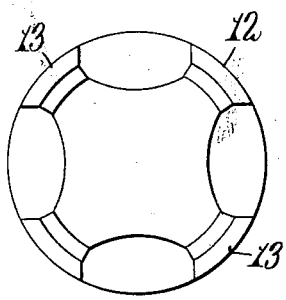
Fig. 3.
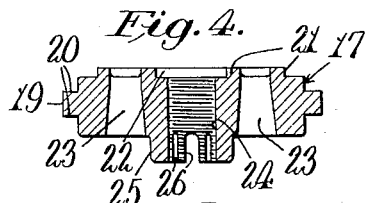
Fig. 4.
Fig. 7.
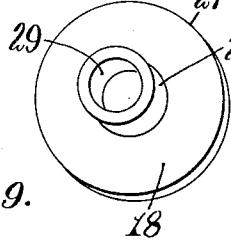
Fig. 8.
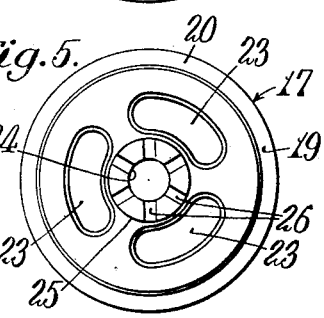
Fig. 5.
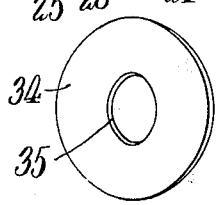
Fig. 9.
Inventor:
Fred D. Holdsworth.
by Louis A. Maxson.
Atty.

Patented Dec. 1, 1931

1,834,590

UNITED STATES PATENT OFFICE

FRED D. HOLDSWORTH, OF CLAREMONT, NEW HAMPSHIRE, ASSIGNOR TO SULLIVAN MACHINERY COMPANY, A CORPORATION OF MASSACHUSETTS

VALVE MECHANISM

Application filed December 29, 1927. Serial No. 243,447.

My invention relates to valve mechanisms. One object of my invention is to provide an improved valve mechanism. Another object of my invention is to provide an improved and simplified valve mechanism for comparatively small air compressors, though it will be understood that the valve mechanism is of general utility. A further object of the invention is to provide an improved valve mechanism comprising a minimum number of parts and constituting a self-contained unit which may be used interchangeably as an inlet or as a discharge valve. Other objects and advantages of the invention will subsequently appear.

In the accompanying drawings in which for purposes of illustration I have shown one illustrative embodiment of the invention:

Fig. 1 is a central vertical section through the upper end of a compressor cylinder and cylinder head and the valve mechanism.

Fig. 2 is a central vertical section through a valve holding element.

Fig. 3 is a bottom view of the element shown in Fig. 2.

Fig. 4 is a central section through the seat element of a valve cage unit.

Fig. 5 is a bottom view, speaking in terms of Fig. 4, of the seat element.

Fig. 6 is a plan view of a valve spring.

Fig. 7 is a diametrical section therethrough.

Fig. 8 is a perspective view of the guard element.

Fig. 9 is a perspective view a valve element.

Referring to the drawings and first to Fig. 1, it will be noted that upon the upper end of the compressor cylinder casting 1 is seated a valve housing 2. The member 2 is provided with a pair of chambers numbered 3 and 4 arranged at opposite sides of a plane including the axis of the compressor cylinder. An inlet passage 5 leads to the chamber 3. A discharge passage 6 leads from the chamber 4. Each of the chambers 3 and 4 is provided at its lower end with a shoulder 7 serving as a seat for a valve cage unit. The walls of the chambers 3 and 4 are threaded at their upper ends to permit the reception of closure elements 8. Each of these closure elements is provided with a threaded bore 9 in which a screw 10 provided with a lock nut 11 may be received. These screws serve to exert pressure on follower or holding elements 12. Each holding element 12 comprises a member whose feet 13 are adapted to engage and hold in position a valve unit.

In the illustrative embodiment of the invention the valve mechanism is shown as comprising two valve units: an inlet valve unit 15, and a discharge valve unit 16. Each of the valve units comprises a seat element designated 17 and a guard element designated 18. The seat element 17 is in the form of a generally circular member having a peripheral flange 19 affording opposite shoulders 20, 20 upon either of which the seat element may be supported. The upper side of the seat element, viewing Fig. 4, is provided with upstanding flange or lip members 21 coaxially arranged and providing coaxial valve seats. Within the inner upstanding flange 21 a recess 22 is formed for a purpose later brought out. A series of ports 23, herein three in number, open through the valve seat element 17, opening between the peripheral flanges 21 at one end and through the bottom at the other. A threaded bore 24 extends from the recess 22 axially through the cage member 17 and terminates at its opposite end in a projecting boss 25 whose walls are slotted as at 26 to provide a series of intersecting notches in which a holding pin may be inserted.

Each guard member 18 comprises a guard portion proper 27 and a supporting portion 28. The portion 27 is approximately annular and of suitable thickness to provide the necessary strength. The portion 28 is tubular and projects from the annular portion 27, being coaxial with the latter and of a diameter to fit the recess 22. Both the annular portion 27 and the supporting portion 28 are traversed by a central opening 29. The guard and seat elements are held in assembled relation as shown in Fig. 1 by means of polygonal headed screws 30, these screws being threaded at 31 to cooperate with the threaded bore 24 in the seat member and being bored as at 32 to permit the passage of a pin 33 therethrough. The pin 33 may obviously be passed through any of the diametrically extending slots 26 and into the bore 32 when the latter is in proper position.

By the construction described all necessity for separate units, one for inlet and one for discharge, is eliminated; and a valve-cage construction requiring but three parts in addition to the holding pin is formed. An annular valve 34 of comparatively thin sheet material, preferably resilient and metallic, is adapted to cooperate with the seat flanges 21. This valve is of a diameter suitable to seat upon both the inner and outer flanges 21 and is perforated at 35 to provide a smooth sliding fit for the tubular portion of the guard member 18. A transversely bowed spring member 36 having upturned ends 37 and perforated at 38 to permit guiding thereof upon the sleeve-like guide portion 28 of the guard 18 is adapted to be arranged between the valve and the guard and is preferably positioned with its ends in contact with the valve, as illustrated.

From the foregoing description the mode of operation of the mechanism will be evident. When the valve cage has been assembled and the parts brought into tight relation by screwing home the screw member 30 and inserting the pin 33 through the notches 26 and bore 32, the valve units are ready for assembly in the cylinder, in which they may be held by the follower member 12 and the screw 10. Gaskets are preferably placed between the shoulder 20 and the shoulder 7. By inverting one of the valves, inlet and discharge units are provided. The mode of operation of the assembled mechanism is obvious. Upon a suction stroke of the compressor piston, (not shown) air entering through the inlet passage 5 and flowing between the legs of the follower member 12, passes downward through the openings 23 in the seat member 17 of the inlet valve unit 15, unseating the valve against the pressure of the spring, and enters the cylinder, flowing out of the cage outwardly above the valve and then past the top of the guard into the cylinder. On the compression strokes of the piston, the inlet valve closes; and when pressure builds up to a sufficient extent, the discharge valve opens and the air passes out through the valve unit 16 to the chamber 4 and so to the discharge line 6. It will be obvious that I have provided a very advantageous and simple valve construction, one equally adapted for use as an inlet and as a discharge unit, and comprising a very small number of parts, each readily produced and very durable.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a valve mechanism, a valve, a seat member having a projecting boss, said seat member and boss being traversed by a threaded bore and said boss being provided with a plurality of radial slots, a guard member seated directly on said seat member and having a central valve guiding portion surrounding a central bore, a screw distinct from said guard member and extending through the bores in said seat and guard members for holding said guard and seat members assembled and having an opening therethrough, and a pin disposable in said opening and slots to hold said parts in assembled relation.

2. In a valve mechanism, a valve, a valve seating spring, a ported valve seat member providing at one side thereof concentric valve seats and also having at the side thereof providing said valve seats a recess, a guard member providing an annular abutment surface and having a guiding portion receivable in said recess, said seat and guard members being traversed by alined bores and the bore in said seat member being threaded, and said seat member having at the side thereof opposite the seats thereon a radially slotted annular boss, and a screw arranged to hold said seat and guard members in assembled relation and having a hole therein to receive a pin to cooperate with the radial slots in the boss.

3. In a valve mechanism, an annular valve, a ported valve seat member having a recess formed axially thereof, a guard member having a hub portion and an abutment portion, said hub portion being adapted to guide said valve, the end of said hub portion being receivable in said recess, said seat member and said hub portion being traversed by alined bores and the bore in said seat portion being threaded, said seat member having at the side thereof opposite said recess a radially slotted annular boss, and a screw arranged to hold said seat and guard members in assembled relation and having a hole therein to receive a pin to cooperate with the radial slots in the boss.

4. In a valve mechanism, a valve, a valve seat member having a central threaded bore, a guard member seated directly on said valve seat member and having a central valve guiding portion surrounding a central bore, and means for maintaining said guard member in rigid relation with said seat member including a threaded element extending through the bores in said guard and seat members and having a head fixed in non-rotative relation thereto and engageable with the guard member, and a threaded portion operatively but releasably engaged in said threaded bore, and means distinct from said seat member and said threaded element and cooperating with both of the latter for preventing turning of said threaded member relative to the valve seat.

5. In a valve mechanism, a valve, a valve seat member having a central threaded bore, a guard member, said members having portions interfitting to effect centering of said guard member with respect to said seat member and spacing said members at a desired distance, and means for maintaining said guard member in rigid relation with said seat member including a threaded element having a head fixed in non-rotative relation thereto and engageable with the guard member, and a threaded portion operatively but releasably engaged in said threaded bore, and means distinct from said seat member and said threaded element and cooperating with both of the latter for preventing turning of said threaded member relative to the valve seat.

In testimony whereof I affix my signature.

FRED D. HOLDSWORTH.